July 15, 1969 E. H. VON HOEVEL 3,455,582
MULTIPLE SEGMENT V-TYPE FLANGE SLIP JOINT COUPLING
Filed Oct. 11, 1967 2 Sheets-Sheet 1
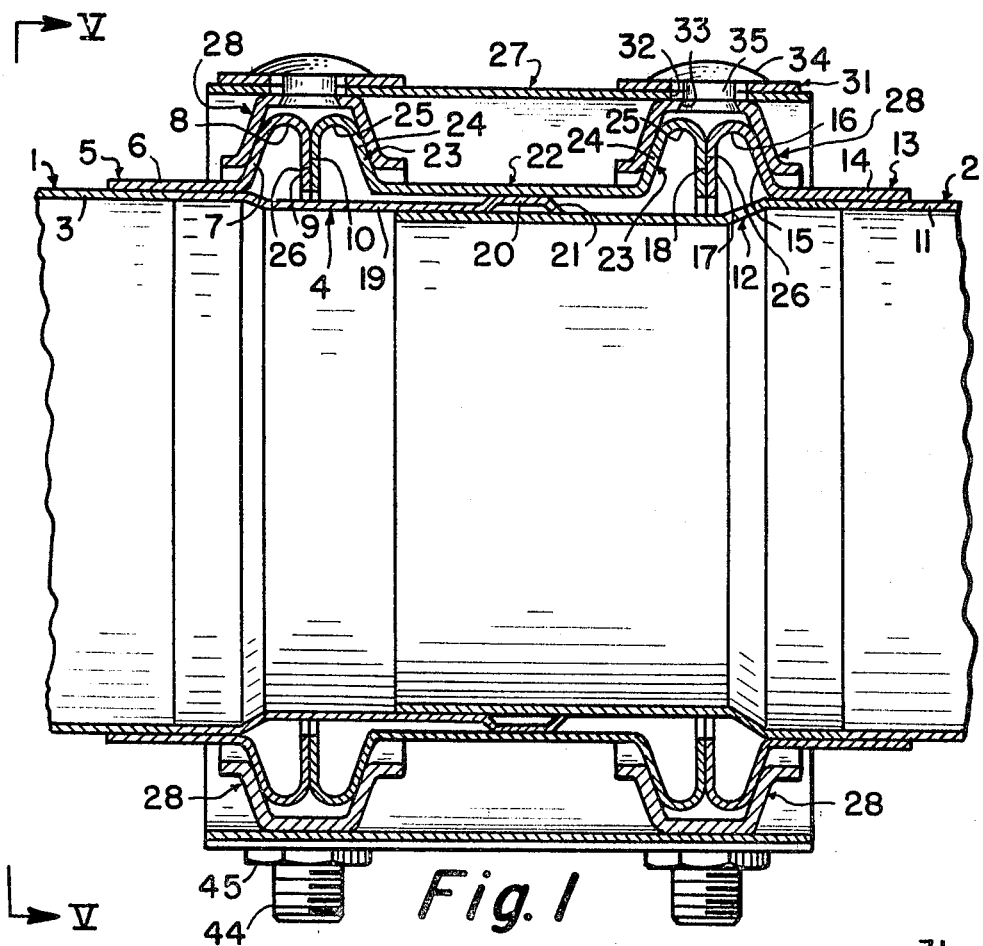
Fig. 1
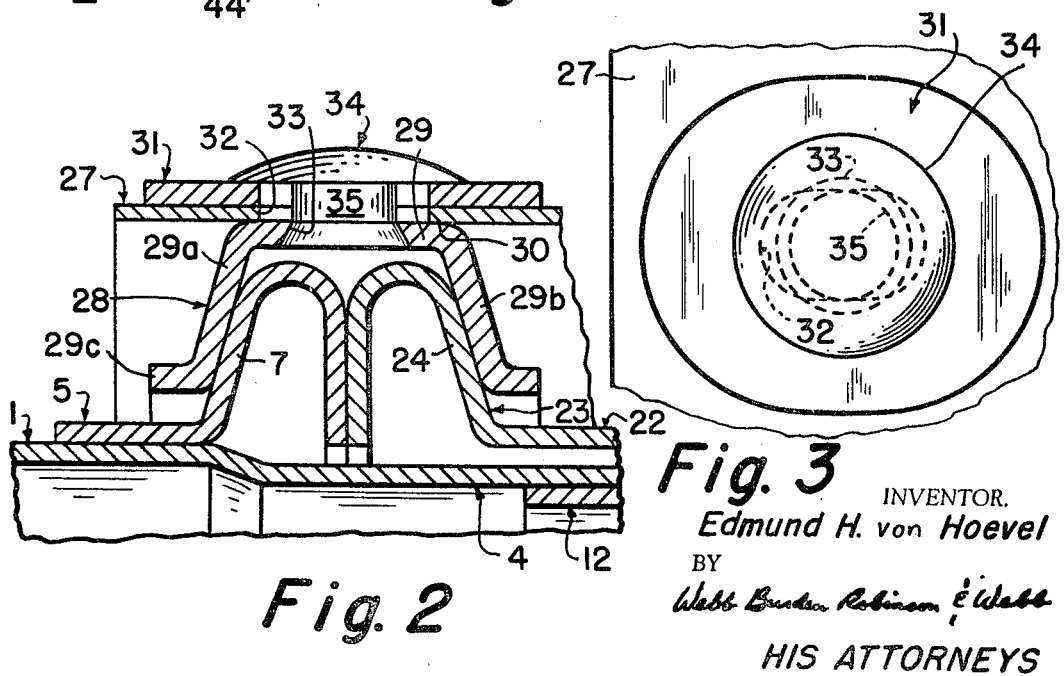
Fig. 2
Fig. 3
INVENTOR.
Edmund H. von Hoevel
BY
Webb Burden Robinson & Webb
HIS ATTORNEYS INVENTOR.
Edmund H. von *Hoevel*
BY
HIS ATTORNEYS

United States Patent Office 3,455,582
Patented July 15, 1969

3,455,582
MULTIPLE SEGMENT V-TYPE FLANGE SLIP JOINT COUPLING
Edmund H. von Hoevel, Export, Pa., assignor to Hanlon & Wilson Company, Jeannette, Pa., a corporation of Pennsylvania
Filed Oct. 11, 1967, Ser. No. 674,450
Int. Cl. F16l 27/12, 39/04
U.S. Cl. 285—302        4 Claims

ABSTRACT OF THE DISCLOSURE

A coupling for connecting a pair of flanged conduit members end-to-end. Between opposed conduit ends is a slip joint forming a passageway through the coupling. A floating member, each end of which has a flange is disposed between the flanges of the conduits and surrounds the slip joint such that the conduit flanges mate with the flanges of the floating member. The mated flanges are constricted by clamping means formed by a bridge-type band which can be tensioned to retain a plurality of segments carried thereby in contact with the flanges. The band is adapted to move relative to the segments to permit the segments to properly seat on the flanges. The coupling accommodates axial and lateral deflection of the conduits with respect to one another, yet provides a fluid-tight coupling of the conduits.

---

This invention relates to conduit couplings, and particularly to a multiple V-type flange coupling for use in joining a pair of conduit members end-to-end such that a fluid-tight passageway is provided through the coupling.

Conduit couplings are well known in the art. Specifically, it has long been known that two conduits may be joined end-to-end by providing the ends of the opposed conduits with flanges and, by means of various clamping devices, forcing the flanges together in an attempt to seal the joint between the conduits. Most such flange connections are subject to leakage for a number of reasons. First, the pressure of the fluid introduced to the conduits tends to push the flanges apart, rather than forcing them together, permitting fluid leakage at the joint. Second, conduits which are directly coupled to one another cannot accommodate either lateral or axial deflection and, if encountered, tend to pull apart at the joint. Morever, since there is usually a small area of contact between the sealing faces of the flanges, a certain amount of leakage was experienced.

My new flange connection, described hereinafter, overcomes the problems experienced in the prior art by incorporating, as part of the coupling, a floating or sleeve member between the flanged conduit members which permits the opposed conduits to move laterally and axially with respect to each other without breaking the conduit connection. A slip joint is included in my coupling forming a substantially uninterrupted fluid-tight passageway through the coupling between conduits disposed end-to-end.

Briefly, my invention is a coupling for connecting two conduits end-to-end in sealing relationship. Each opposed end of the opposed conduits is provided with a flange. Axially disposed between the conduits is a floating member having at each end a flange configuration complementary to those on the opposed conduits. Within the floating member and extending between the opposed conduit ends is a slip joint connection formed by a male member secured coextensively to an end of one conduit and axially insertable within a female member secured coextensively to the opposed conduit. The flanges of the conduits and the floating members are mated and retained by a clamping means formed by a plurality of segments movably attached to a bridge-type band which can be tightened to force the segments against the flanges.

A clear understanding of my invention will be obtained from the following specification and the accompanying drawings. In the drawings:

FIG. 1 is a broken sectional view taken along the line I—I of FIG. 5 of a pair of conduits disposed end-to-end and connected by my novel coupling;

FIG. 2 is an enlarged partial sectional view of the band and segment connection of the clamping means;

FIG. 3 is an enlarged partial plan view of the connection of the band segment of FIG. 2;

Figure 4:
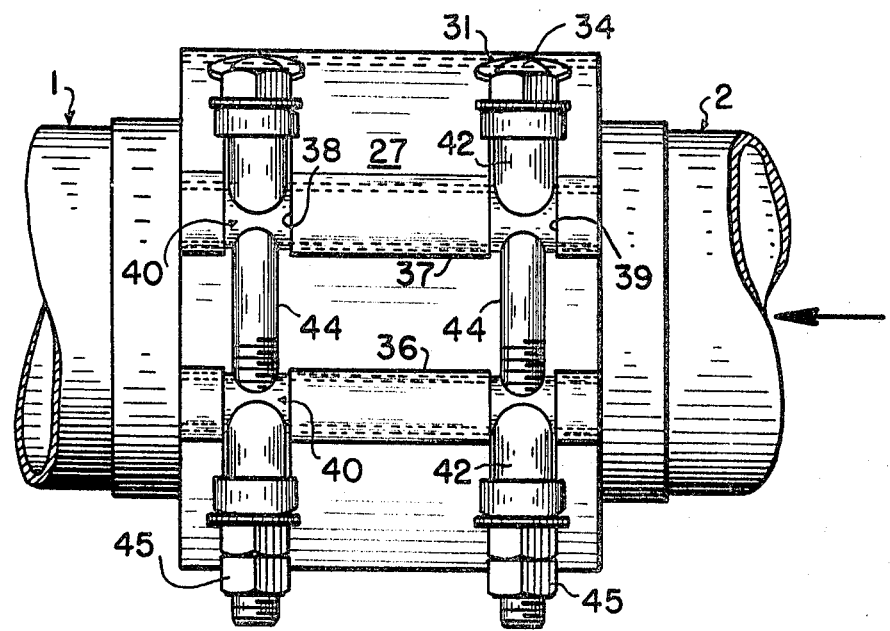
FIG. 4 is an elevational view of my coupling.

Referring to FIG. 1, there is shown my novel coupling for connecting a pair of conduits 1, 2 end-to-end in a sealing relationship. The conduit 1 includes an outer wall 3. A female member 4 of the slip joint connection extends from conduit 1 substantially axially coextensively with the wall 3 of conduit 1 in the direction of conduit 2.

A flange 5 including a collar 6 extends around the connection of the wall 3 and the female member 4. The collar may be seam welded to both the wall 3 and to the female member 4 to join them together or the member 4 may be formed integrally with the wall 3 making only a single seam weld necessary.

Radially extending from the collar 6 and surrounding the female member 4 is a portion 7 of the flange 5, the end of which defines a rim portion 8. A radially projecting flange portion 9 extends from rim portion 8 in the direction of the axis of the member 4 to form an annular contact face 10.

A similar construction is provided on the conduit 2 which includes a wall 11. A male member 12 extends from the conduit 2 substantially axially coextensively with the wall 11 of the conduit in the direction of the conduit 1.

A flange 13 having a collar 14 surrounds the connection of the wall 11 to the male member 12. As previously described in connection with conduit 1, the male member 12 may be secured to the conduit wall 11 by welding to the collar 14 or the member 12 may be formed integrally with the conduit wall 11. A portion 15 of the flange 13 radially extends from the collar 14, the end thereof forming a rim portion 16. Radially projecting from the rim portion 16 in the direction of the axis of the male member is a flange portion 17 having an annular contact face 18.

The male member 12 is slideably axially engageable within the female member 4. As shown in FIG. 1, the diameter of the female member 4 is slightly constricted in the area of the flange portion 4 and provides a relatively tubular wall 19, the outer end of which is expanded to provide a wall portion 20 having an annular lip 21 which facilitates entry of the male member 12 into the female member 4. This slip joint connection permits axial movement of the conduits 1, 2 relative to one another.

A floating member 22 is disposed between the opposed conduits 1 and 2 and surrounds the slip joint connection formed by the male member 12 and the female member 4. The floating member comprises a central sleeve portion, each end of which is characterized by a flange 23 of configuration complementary to the flanges, at each end of the conduits 1, 2. Each flange 23 comprises a radially extending flange portion 24, the end of which defines a rim portion 25. From the rim portion 25, a portion of the flange 23 projects radially toward the axis of the member 22 forming annular contact faces 26, one on each end of the floating member 22. When the conduits 1 and 2 are connected by my novel coupling, the contact faces 10 and 18 mate with contact faces 26 of the floating member 22 to provide a sealed conduit coupling.

The coupling is maintained by a clamping means comprising a bridge-type band 27 to which are movably secured a plurality of segments 28. The segments 28 are arranged, as shown in FIG. 1, in two spaced parallel rings extending around the flanges to be retained. By tightening the band, the segments are forced against the flanges coupling each conduit 1, 2 to the floating member 22. Each ring comprises a number of segments 28; in FIG. 5, three segments 28a, 28b, and 28c are shown.

Since each flanged end of the floating member is clamped to a flange of a conduit in the same manner, it will be necessary only to describe one such connection in detail, it being understood the other is the same. Using the same identifying numerals for corresponding components as in FIG. 1, I have shown in FIGS. 2 and 3 the connection between a flange 5 on the end of a conduit 1 and a flange 23 on one end of the floating member 22 with respect to a single segment 28.

The clamping means includes a curved segment 28 having a top wall 29 and a pair of diverging legs 29a and 29b. At the end of each diverging leg is a lip 29c. The legs 29a, 29b are substantially parallel to the extending portion 7 of the flange 5 on the conduit and portion 24 of the flange 23 floating member. The top wall 29 is substantially parallel to and contiguous with a portion 30 of the band 27. A curved plate 31 is secured, as by spot welding, to the band 27 on the opposite side of the top wall from the segment 28, as shown in FIG. 3. An oval aperture 32 extends through the band 27 and the plate 31. The wall 29 of the segment 28 is counterbored to provide an opening 33 which is aligned with the aperture 32 of the band and plate. A button head rivet 34, having a shank 35 of diameter substantially the same as the minor axis of the oval aperture 32 extends through the aperture 32 into the wall 29 where it is upset to fill the counterbored opening 33. Thus, the segment 28 is free to move relative to the band 27 along the major axis of the oval aperture 32, so that as the band is constricted to force a segment against the converging walls of the V-type flange, the segments will find their proper lateral seat with respect to the opposed mated flanges to provide maximum sealing ability.

Figure 5:
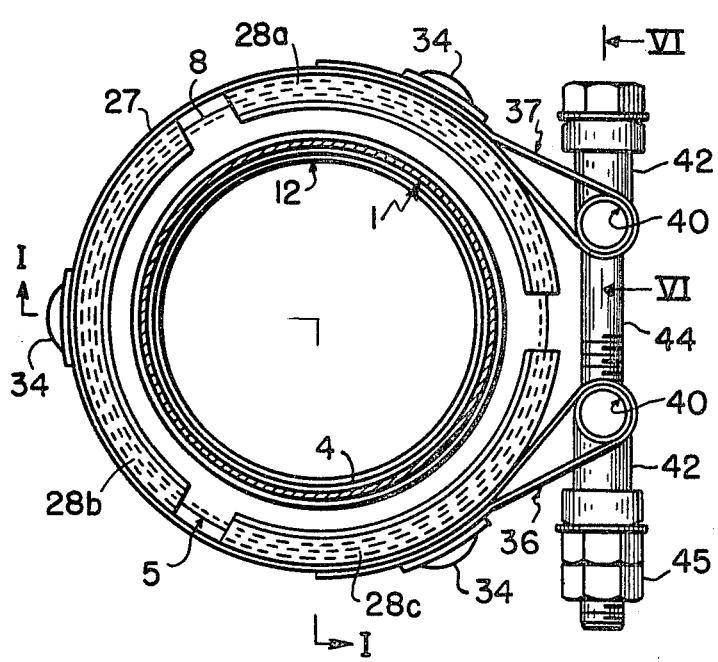
FIG. 5 is a sectional view taken along the line V—V of FIG. 1 showing the multiple V-type flange clamping means applied to the flanged ends of the floating member and an end of a conduit.
Figure 6:
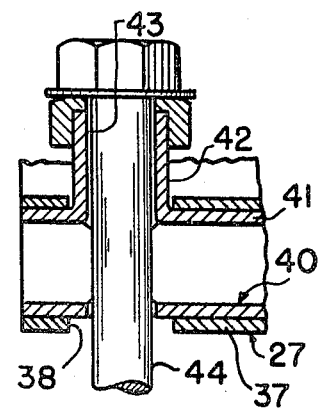
FIG. 6 is a sectional view taken along the line VI—VI of FIG. 5.

The means for constricting the segments 28 about the flanges of a conduit and the supporting member is by tensioning the band 27 to draw together its free ends. As shown in FIGS. 4–6, the band 27 of the clamping means extends substantially around the coupling. Each end of the band is reversed upon itself and secured, as by spot weld or riveting, to form a pair of loops 36, 37 by which the ends of the band are pulled toward each other to force the segments 28 over the flanges.

Each end of the band, as shown in FIG. 4, includes a pair of spaced slots 38, 39 which extend longitudinally of the band such that when an end of the band is looped, the slots provide lateral openings in the loops 36, 37. Between the end of the band and each slot a hole may be provided in the band. A similar hole is located at the opposite end of each slot such that the holes at each end of a slot in the band are aligned when the end of the band is looped. A rivet 34 inserted through the holes holds the loops 36, 37, as shown in FIG. 5. Alternatively, the free ends of the band may be spot welded on the band to form the loops 36, 37.

Within each loop are a pair of T-type retainer pins 40 (shown in detail in FIG. 6), each arm 41 of which is journaled in the loop and a shank 42 of which extends transversely of the band 27. An opening 43 is provided in the pin shank through which a bolt may be inserted. When the shanks 42 of opposed pins 40 are aligned, bolts 44 may be inserted through the respective shank openings 43 and nuts 45 or similar fastening means threaded to the bolts. By tightening the bolts, the pins 40 are drawn toward one another, tensioning the band 27 around the segments 28 and applying pressure to the V-type flanges at the ends of the conduits 1, 2, and the supporting member 22. This, of course, closes the contact faces of the flanges and seals the coupling against fluid leakage.

Since all components of the assembly may be made of sheet metal fabricated and stamped materials, my coupling is extremely inexpensive and easy to manufacture and assemble. As a corollary, in the event of damage to any of the conduit members, the slip joint connection, the floating member and the clamping device, disassembly of the coupling is quick and inexpensive, eliminating down time. My coupling is especially effective in connection with equipment which is subject to vibration or conduit contortion, since the coupling maintains a substantially leak-proof seal despite variance in the axial or lateral alignment of the two conduits joined by the coupling.

I claim:
1. A coupling for axially connecting a pair of conduits in substantially sealing arrangement comprising:
 (A) an end of each conduit characterized by
  (1) a flange portion extending radially from an end of the conduit;
  (2) said portion terminating in a portion which projects toward the axis of the conduit;
  (3) said projecting flange portion providing an annular contact face;
 (B) a slip joint connection between the axially opposed ends of the pair of conduits including
  (1) a female member secured to the flange portion of one of the conduits and extending axially from said one conduit and beyond said projecting flange portion;
  (2) a male member secured to the flange portion of the other of said conduits and extending axially from said other conduit and beyond the projecting flange portion of the other of said conduits;
  (3) said male member being slideably axially engaged with said female member to provide a continuous passageway between said conduits and within said coupling;
 (C) a floating connection engaging the flange portions of the conduits including
  (1) a collar extending around said slip joint connection and axially between said opposed projecting flange portions of said pair of conduits;
  (2) each end of said collar extending radially from the axis of said collar to form a flange portion of substantially the same configuration as the flange portions of each of the two conduits to provide a projecting annular contact face complementary to said first mentioned conduit flange contact faces;
  (3) whereby upon assembly of the coupling said contact faces are in abutting relationship to form a seal between said conduits and said floating connection; and
 (D) clamping means engaged with the flange portions of said conduits and said floating connection applying pressure to the flange portions thereof forcing the contact faces of the projecting flange portions of said conduits and connection toward each other to substantially seal the coupling.
2. A coupling for axially connecting a pair of conduits, opposed ends of which include flanges, end-to-end comprising:
 (A) a slip joint connection including
  (1) a female member connected to and extending from an end of one of the conduits from within a flange extending radially therefrom;

(2) a male member connected to and extending from the opposed end of the other of the conduits from within a flange extending radially therefrom;

(3) said male member being slideably engaged within said female member when the coupling is assembled;

(B) a floating member disposed between said flanges of opposed conduits in engagement therewith, and surrounding said slip joint connection, said member including (1) a collar portion;

(2) each end of which has a radially extending flange complementary to the flange on an opposed conduit with which it is engaged; and (C) clamping means surrounding the flanged ends of the conduits and the floating member and engageable therewith forcing the flanges toward each other to form a substantially fluid-tight connection between said conduits.

3. A coupling as set forth in claim 2 wherein said clamping means comprises:

(A) an elongated flat bridge-type band;

(B) a plurality of segments having means movably securing said segments to the band such that the band can move longitudinally relative to the segments, said segments being substantially U-shaped curved sections;

(1) each U-shaped segment including a top wall which is substantially contiguous with one surface of the band; and (2) diverging legs which, when the coupling is assembled, extend in a direction away from the band to engage frictionally complementary converging flange portions of a pair of mated flanges of a conduit and the floating member;

(C) said flanges being forced together by said plurality of segments disposed along the band when the band is constricted around the coupling.

4. A coupling for connecting a pair of opposed conduits end-to-end comprising:

(A) a flange secured to an opposed end of each of the opposed conduits, each flange having an annular contact face;

(B) a floating member axially disposed between said conduits and including a collar portion each end of which includes a flange having a complementary configuration to said first-mentioned flanges and annular contact faces mating with said first-mentioned annular contact faces; and (C) clamping means surrounding the opposed flanges retaining the floating member between the conduits such that the faces mate in substantially fluid-tight relationship, said clamping means comprising an elongated bridge-type band including:

(1) a spaced pair of a plurality of segments having means movably securing said segments to the band, said segments extending along the length of the band;

(2) each segment being substantially U-shaped in cross-section and having (a) a top wall parallel to and contiguous with said band;

(b) the legs of each U-shaped segment extending from said top wall such that when the band is disposed about the coupling, the legs frictionally engage converging flange portions of opposed mating flanges of a conduit and the floating member and when the band is tensioned the opposed contact faces of mating flanges are forced together in sealing relation;

(3) said band carrying the spaced pair of the plurality of segments extending across said floating member simultaneously contacting a flange of each of the floating member and an end of the conduit; and (4) means connected to each end of the band tensioning the band whereby the segments are forced against the opposed flanges closing the opposed contact faces tightly against one another.

References Cited

UNITED STATES PATENTS

| 2,653,040 | 9/1953 | Golluppi | 285—233 X |
| 2,769,648 | 11/1956 | Herman | 285—366 X |
| 2,842,385 | 7/1958 | Webster et al. | 285—408 |

FOREIGN PATENTS

| 1,150,947 | 1/1958 | France. |
| 1,173,717 | 3/1959 | France. |
| 928,925 | 6/1955 | Germany. |
| 952,755 | 3/1964 | Great Britain. |

CARL W. TOMLIN, Primary Examiner

DAVE W. AROLA, Assistant Examiner

U.S. Cl. X.R.

285—367